(12) United States Patent
Miyamoto et al.

(10) Patent No.: US 8,602,645 B2
(45) Date of Patent: Dec. 10, 2013

(54) TEMPERATURE DETECTION SYSTEM

(75) Inventors: Noboru Miyamoto, Tokyo (JP); Akira Yamamoto, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 982 days.

(21) Appl. No.: 12/137,916

(22) Filed: Jun. 12, 2008

(65) Prior Publication Data

US 2009/0161726 A1 Jun. 25, 2009

(30) Foreign Application Priority Data

Dec. 25, 2007 (JP) ................................. 2007-331965

(51) Int. Cl.
*G01K 7/04* (2006.01)
*G01K 3/08* (2006.01)
*G05F 1/08* (2006.01)

(52) U.S. Cl.
USPC ............... 374/178; 374/1; 374/183; 374/172; 327/513; 327/541; 702/130; 702/99; 323/907

(58) Field of Classification Search
USPC .......... 327/512, 513, 541, 539, 540; 374/1, 2, 374/171, 72, 173, 178, 172, 4, 5, 100, 183, 374/185; 702/130, 131, 132, 133, 134, 135, 702/136, 99, 117, 118; 361/103, 93.8, 24, 361/323, 313, 907, 315, 316, 93.1; 324/760, 765; 323/313, 907, 315, 316
See application file for complete search history.

(56) References Cited

U.S. PATENT DOCUMENTS

| | | | | |
|---|---|---|---|---|
| 3,776,039 A * | 12/1973 | Bowen | ........................... | 374/147 |
| 5,049,961 A * | 9/1991 | Zommer et al. | .............. | 257/470 |
| 5,080,496 A * | 1/1992 | Keim et al. | ..................... | 374/144 |
| 5,237,481 A * | 8/1993 | Soo et al. | ........................ | 361/103 |
| 5,886,515 A * | 3/1999 | Kelly | .............................. | 323/313 |
| 6,735,065 B2 * | 5/2004 | Graf et al. | ...................... | 361/103 |
| 6,824,308 B2 * | 11/2004 | Sumimoto et al. | ............. | 374/185 |
| 7,006,933 B2 * | 2/2006 | Miyamoto | ........................ | 702/60 |
| 7,035,064 B2 * | 4/2006 | Schimanek et al. | ............ | 361/23 |
| 7,528,645 B2 * | 5/2009 | Scheikl et al. | .................. | 327/513 |
| 7,649,724 B2 * | 1/2010 | Huber | ............................ | 361/93.1 |
| 7,652,585 B2 * | 1/2010 | Schierling | ...................... | 340/635 |
| 7,835,129 B2 * | 11/2010 | Thiele | ............................ | 361/103 |
| 7,839,201 B2 * | 11/2010 | Jacobson | ........................ | 327/513 |
| 7,988,354 B2 * | 8/2011 | Jansen | ............................ | 374/170 |

(Continued)

FOREIGN PATENT DOCUMENTS

DE 19852080 C1 * 8/2000
DE 100 31 115 A1 1/2001

(Continued)

*Primary Examiner* — Gail Verbitsky
(74) *Attorney, Agent, or Firm* — Oblon, Spivak, McClelland, Maier & Neustadt, L.L.P.

(57) ABSTRACT

A temperature detection system includes a power semiconductor device, a chip temperature detection device for detecting a temperature of the power semiconductor device, loss-related characteristic value acquiring means for acquiring a loss-related characteristic value that is a characteristic to decide a loss of the power semiconductor device, difference value calculating means for calculating, from the loss-related characteristic value, a difference value between the temperature of the power semiconductor device and a temperature detected by the chip temperature detection device, a corrected temperature signal generating part for generating a corrected temperature signal by adding the temperature detected by the chip temperature detection device and the difference value, and an output part for outputting the corrected temperature signal to the outside.

15 Claims, 4 Drawing Sheets

(56) References Cited

U.S. PATENT DOCUMENTS

| | | | |
|---|---|---|---|
| 8,288,995 B2* | 10/2012 | Jimbo et al. | 320/126 |
| 2004/0083075 A1* | 4/2004 | Fan | 702/129 |
| 2006/0171443 A1* | 8/2006 | Rund | 374/208 |
| 2006/0279894 A1* | 12/2006 | Lenz et al. | 361/103 |
| 2009/0024345 A1* | 1/2009 | Prautzsch | 702/99 |
| 2009/0072887 A1* | 3/2009 | Scheikl et al. | 327/530 |
| 2010/0079197 A1* | 4/2010 | Ladurner et al. | 327/512 |
| 2012/0262227 A1* | 10/2012 | Nagata | 327/541 |
| 2012/0267950 A1* | 10/2012 | Saito et al. | 307/10.6 |
| 2013/0060499 A1* | 3/2013 | Yoshimura | 702/99 |
| 2013/0088280 A1* | 4/2013 | Lal et al. | 327/513 |

FOREIGN PATENT DOCUMENTS

| | | | |
|---|---|---|---|
| DE | 100 63 444 A1 | | 5/2002 |
| DE | 102006019981 A1 | * | 1/2007 |
| JP | 7-75349 | | 3/1995 |
| JP | 7-107784 | | 4/1995 |
| JP | 7-135731 | | 5/1995 |
| JP | 7-153920 | | 6/1995 |
| JP | 8-322240 | | 12/1996 |
| JP | 10-337084 | | 12/1998 |
| JP | 11258063 A | * | 9/1999 |
| JP | 2004-117111 | | 4/2004 |
| JP | 2011036095 A | * | 2/2011 |

* cited by examiner

TEMPERATURE DETECTION SYSTEM

BACKGROUND OF THE INVENTION

1. Field of the Invention

The present invention relates to a temperature detection system for measuring the temperature of a power semiconductor device with a high degree of precision.

2. Description of the Related Art

An apparatus in which a power semiconductor device having a large heating value such as a power semiconductor module or the like is incorporated, is typically provided with a temperature detection system as part of the apparatus. The following illustrates uses of temperature signals detected by and output from the temperature detection system. First, it is used for overheat protection of the power semiconductor device. If the above-mentioned temperature signal is used, control to prevent or detect that the power semiconductor device reaches a predetermined temperature or more is possible. As another example, the above-mentioned temperature signal can be used when an apparatus in which the above-mentioned power semiconductor device is incorporated performs feedback control. In this case, since a control signal to the power semiconductor device or the like is defined based on the above-mentioned temperature signal, it is possible to generate a control signal with reduced loss.

As discussed above, the temperature signal detected by and output from the temperature detection system is useful in overheat protection or to reduce losses in feedback control. Then, as this temperature signal approaches high precision, i.e., as it becomes closer to the highest temperature value of the power semiconductor device, it is preferable to make it possible to perform proper overheat protection and to generate a control signal with reduced loss.

Patent Document 1 discloses a temperature detection system including a thermistor arranged in a position spaced from the power semiconductor device, and an on-chip temperature sensor closer to the highest temperature generating part in the power semiconductor device than the above-mentioned thermistor. This temperature detection system uses the thermistor to perform temperature detection with high S/N ratio when the temperature of the power semiconductor device is so low that the overheat protection is not needed. On the other hand, if the temperature of the power semiconductor device is high and close to temperature at which the overheat protection is needed, temperature close to the temperature of the power semiconductor device is detected by means of the on-chip temperature sensor. Thus, the temperature detection system disclosed in Patent Document 1 changes the temperature detection methods according to the temperature of the power semiconductor device.

[Patent Document 1] Japanese Patent Application Laid-Open No. 07-135731

[Patent Document 2] Japanese Patent Application Laid-Open No. 07-153920

[Patent Document 3] Japanese Patent Application Laid-Open No. 07-075349

[Patent Document 4] Japanese Patent Application Laid-Open No. 07-107784

[Patent Document 5] Japanese Patent Application Laid-Open No. 08-322240

[Patent Document 6] Japanese Patent Application Laid-Open No. 10-337084

As described in Patent Document 1, between the temperature output from the thermistor or on-chip temperature sensor and the highest temperature in the power semiconductor device, if a position at which the temperature sensor is provided and a position (highest temperature point) in the power semiconductor device, the position indicating the highest temperature during normal operation are different, there is a temperature difference. Then, the temperature difference varies according to the value of a load on the power semiconductor device or the like (e.g., current or voltage). However, a temperature signal output from the temperature detection system described in Patent Document 1 or any other patent document does not consider that the temperature difference varies. Therefore, it is considered that the temperature signal generated by the temperature detection system described in Patent Document 1 or the like may not accurately reflect the temperature of the power semiconductor device. As a result, there is a problem that proper overheat protection cannot be performed or a control signal with reduced loss cannot be generated. The temperature difference can be eliminated by placing the on-chip temperature sensor at the highest temperature point of the power semiconductor device. However, in such a case, there often occur problems that it adversely affects the performance of the power semiconductor device and it makes wire bonding in the assembly process difficult.

SUMMARY OF THE INVENTION

The present invention has been made to solve the above problems, and it is an object thereof to provide a temperature detection system that can measure the temperature of a power semiconductor device with a high degree of precision.

According to one aspect of the present invention, a temperature detection system includes a power semiconductor device, a chip temperature detection device for detecting a temperature of the power semiconductor device, loss-related characteristic value acquiring means for acquiring a loss-related characteristic value that is a characteristic to decide a loss of the power semiconductor device, difference value calculating means for calculating, from the loss-related characteristic value, a difference value between the temperature of the power semiconductor device and a temperature detected by the chip temperature detection device, a corrected temperature signal generating part for generating a corrected temperature signal by adding the temperature detected by the chip temperature detection device and the difference value, and an output part for outputting the corrected temperature signal to the outside.

Other and further objects, features and advantages of the invention will appear more fully from the following description.

DETAILED DESCRIPTION OF THE PREFERRED EMBODIMENTS

First Embodiment

Figure 1:
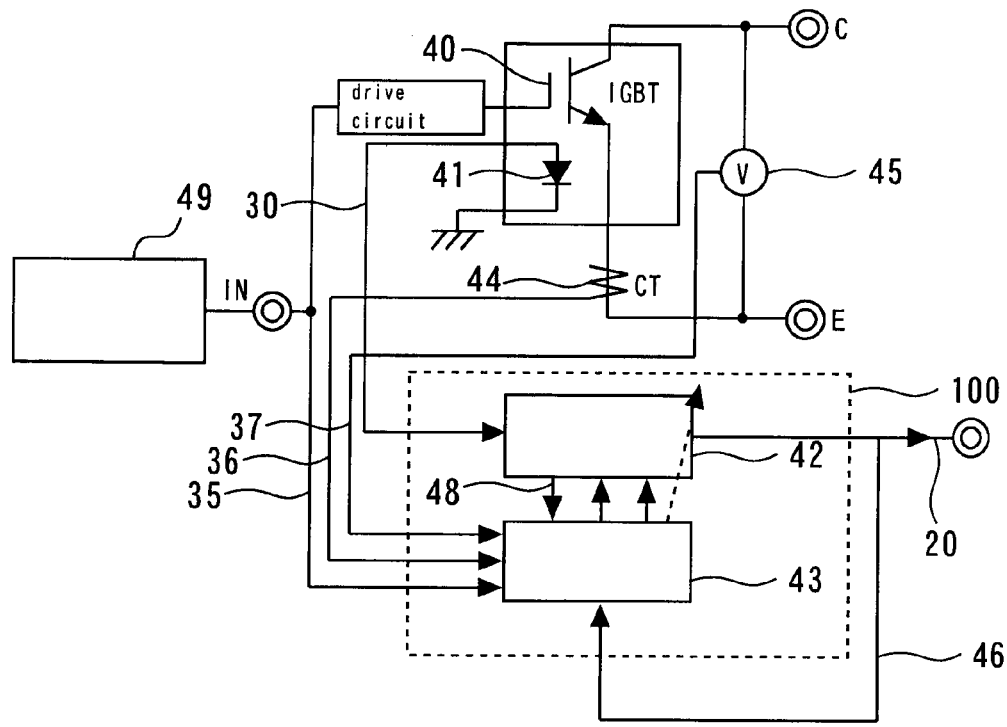
FIG. 1 is a conceptual diagram for explaining the structure of the first embodiment.

This embodiment relates to a temperature detection system for measuring the temperature of a power semiconductor device with a high degree of precision. The temperature difference between the highest temperature of the power semiconductor device and temperature at a position where a temperature sensor is located, i.e., a value to be corrected, can be calculated as a function of a thermal resistance value Rth (j–s), defined by the positional relationship between the highest temperature point and the position of the temperature sensor, and the load on the power semiconductor device. Since Rth (j–s) takes a fixed value with respect to a physical relationship of the power semiconductor device (chip), the value to be corrected (temperature difference) can be calculated as a function of the load on the power semiconductor device. FIG. 1 is a conceptual diagram for explaining the structure of the embodiment. The embodiment is provided with a power semiconductor device (chip) 40. Then, a chip temperature detection device (hereinafter referred to as "temperature sensor 41") as a diode temperature sensor is arranged on a peripheral surface of the power semiconductor device 40. Further, the temperature detection system of the embodiment is provided with a temperature calculation processing section 100 indicated by a broken box in FIG. 1. The temperature calculation processing section 100 makes a correction in such a manner that the temperature detected by the temperature sensor 41 (hereinafter referred to as "sensor detection temperature") corresponds to the highest temperature (hereinafter also referred to as "actual temperature") in the power semiconductor device 40.

The temperature calculation processing section 100 is provided with a temperature sensor correction processing part 42 and a semiconductor load corrected value setting part 43. The temperature sensor correction processing part 42 corrects the sensor detected temperature based on a value obtained from the subsequent semiconductor load corrected value setting part 43, and the corrected temperature is output as a temperature sensor output 20. On the other hand, the semiconductor load corrected value setting part 43 acquires load characteristics and the like to be described later and defines various values to be described later and used for processing by the temperature sensor correction processing part 42 in order to obtain the above-mentioned corrected temperature.

The temperature detection system of the embodiment is also provided with a current sensor 44 such as a current transformer (CT) for measuring a current value of the power semiconductor device 40. A voltage sensor 45 is further provided to measure a voltage value of the power semiconductor device 40. Further, a power meter (not shown) is provided to measure a power value of the power semiconductor device 40. The current value, the voltage value, and the power value respectively measured by the current sensor 44, the voltage sensor 45, and the power meter are transmitted to the temperature calculation processing section 100 through a current transport pathway 36, a voltage transport pathway 37, and a power transport pathway, respectively. Note that a function part (not shown) can be provided inside or foregoing part of the temperature calculation processing section 100 to perform processing for signal conversion and the like suitable for the semiconductor load corrected value setting part 43 dealing with respective transmitted signals according to the circumstances.

The temperature detection system of the embodiment is further provided with a driving signal transport pathway 35. The driving signal transport pathway 35 is a pathway (wiring) for transmitting the driving signal from the power semiconductor device 40 to the temperature calculation processing section 100. This driving signal contains information on driving frequency. Note that the driving signal is generated by a host system 49.

The above-mentioned driving signal, current value, voltage value, and power value are parameters defining how to correct the sensor detected temperature in the temperature calculation processing section 100. In other words, the temperature calculation processing section 100 is used not only to calculate a difference value between the temperature (highest temperature) of the power semiconductor device 40 and the sensor detected temperature from the driving signal, the current value, the voltage value, and the power value, but also to define a temperature resolution upon signal amplification and a filter time constant. Then, it adds a difference value to the sensor detected temperature as the temperature sensor output 20, and outputs a value processed using the temperature resolution upon signal amplification and filter time constant, and the like.

The above describes the conceptual structure of the embodiment. The main feature of the embodiment is the temperature calculation processing section 100 in FIG. 1. The following describes a specific structure of the temperature calculation processing section 100 of the embodiment with reference to FIG. 2.

Figure 2:
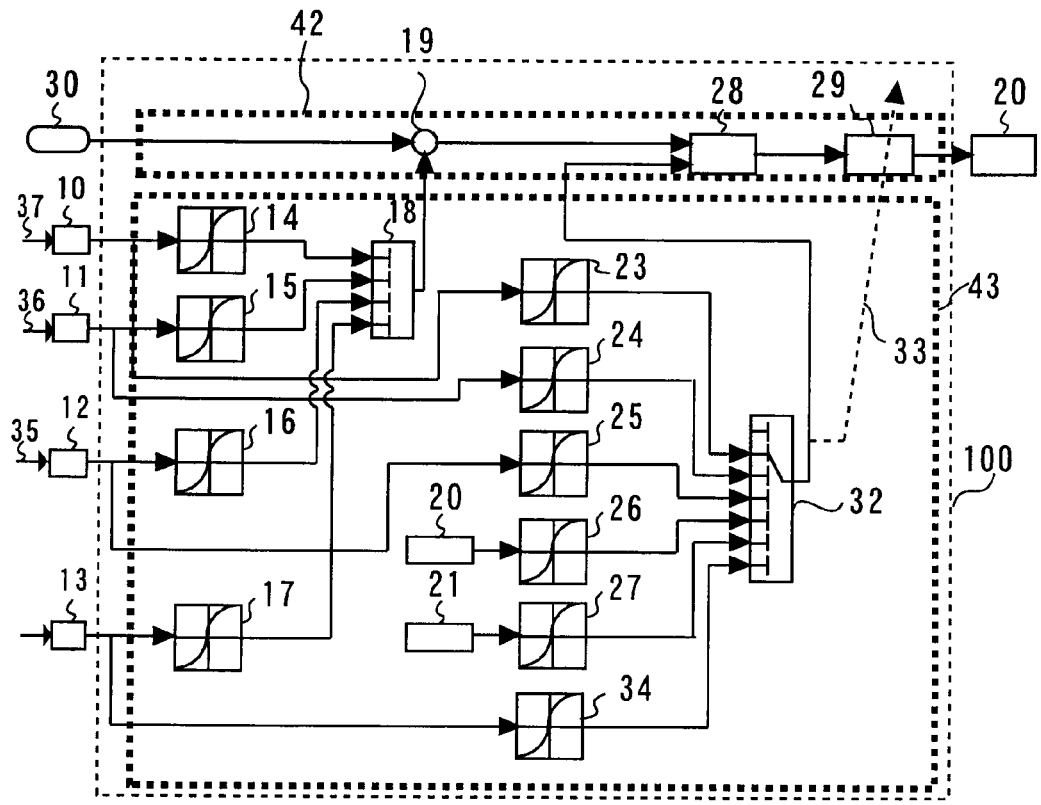
FIG. 2 is a block diagram for explaining the structure of the temperature calculation processing section.

FIG. 2 is a block diagram for explaining the structure of the temperature calculation processing section 100 and the like of the embodiment. In FIG. 2, the temperature calculation processing section 100 is indicated by a broken box. Further, temperature sensor correction processing part 42 and semiconductor load corrected value setting part 43 provided in the temperature calculation processing section 100 are indicated by broken boxes, respectively.

The temperature sensor correction processing part 42 is provided with an adder part 19, a gradient adjustment block 28, and filter 29. Then, a signal of the sensor detected temperature and various signals generated as correction values in the semiconductor load corrected value setting part 43 to be described below are input to this temperature sensor correction processing part 42. Next, the semiconductor load corrected value setting part 43 has an actual correction difference value generating part and an adjusted value/time constant generating part. The voltage signal, the current signal, the driving signal, and power signal are input to the actual correction difference value generating part. Here, the voltage signal, the current signal, the driving signal, and the power signal relates to the power semiconductor device. In other words, the voltage signal, the current signal, the driving signal, and the power signal can be load characteristics of the power semiconductor device load characteristics. Here, the load characteristics mean characteristics related to losses of the power semiconductor device. The voltage signal, the current signal, the driving signal, and the power signal are input from the above-mentioned transport pathways (35 to 37) through a voltage signal conversion part 10, a current signal conversion part 11, a driving signal conversion part 12, and a power signal conversion part 13, respectively.

The following describes the structure of the actual correction difference value generating part that receives the above-mentioned inputs. The actual correction difference value generating part is provided with a first correction mapping part 14. A correlation between a difference value of the sensor detected temperature and actual temperature (hereinafter simply referred to as "difference value,") and the voltage value of the power semiconductor device is stored in the first correction mapping part 14. Then, the first correction mapping part 14 outputs the above-mentioned difference value based on the above-mentioned correlation whenever the voltage value of the power semiconductor device is input. Note that the difference value output from the first correction mapping part 14 is called the first difference value.

Further, the actual correction difference value generating part is provided with a second correction mapping part 15. A correlation between the difference value and the current value of the power semiconductor device is stored in the second correction mapping part 15. Then, the second correction mapping part 15 calculates a difference value based on the correlation whenever the current value of the power semiconductor device is input. Note that the difference value output from the second correction mapping part 15 is called a second difference value.

Further, the actual correction difference value generating part is provided with a third correction mapping part 16. A correlation between the difference value and a driving signal (driving frequency) of the power semiconductor device is stored in the third correction mapping part 16. Then, the third correction mapping part 16 calculates the difference value based on the above-mentioned correlation whenever the driving signal of the power semiconductor device is input. The difference value output from the third correction mapping part 16 is called a third difference value.

Further, the actual correction difference value generating part is provided with a fourth correction mapping part 17. A correlation between the difference value and the power value of the power semiconductor device is stored in the fourth correction mapping part 17. Then, the fourth correction mapping part 17 calculates a difference value based on the above-mentioned correlation whenever the power value of the power semiconductor device is input. The difference value output from the fourth correction mapping part 17 is called a fourth difference value.

Further, the actual correction difference value generating part is provided with a weighting calculation part 18 which is arranged after the above-mentioned first correction mapping part 14, second correction mapping part 15, third correction mapping part 16, and fourth correction mapping part 17. The weighting calculation part 18 weights the first difference value, the second difference value, the third difference value, and the fourth difference value in a manner to be described later to calculate a difference value (hereinafter referred to as "actual correction difference value") so that the actual sensor detected temperature is to be corrected.

The output of the weighting calculation part 18, i.e., the actual correction difference value, is sent to the adder part 19 of the temperature sensor correction processing part 42, in which the actual correction difference value is added to the sensor detected temperature. Then, an addition result is sent to the following gradient adjustment block 28.

The following describes the structure of an adjusted value/time constant generating part in the semiconductor load corrected value setting part 43 shown in FIG. 2. The adjusted value/time constant generating part is provided with a first gradient/filter time constant mapping part 23. A correlation between the voltage value of the power semiconductor device and a temperature resolution to be used upon signal amplification with respect to the voltage value is stored in the first gradient/filter time constant mapping part 23. The voltage value of the power semiconductor device and the value of the filter time constant to be used with respect to the voltage value are also stored in the first gradient/filter time constant mapping part 23. Further, the first gradient/filter time constant mapping part 23 can output a temperature resolution and a filter time constant suitable for the voltage value from the input voltage value of the power semiconductor device.

Here, if the input voltage value is higher than a predetermined value, the first gradient/filter time constant mapping part 23 outputs a content that lower values of the temperature resolution and the filter time constant should be selected. On the other hand, if the input current value is lower than a predetermined value, the first gradient/filter time constant mapping part 23 outputs a content that high values of the temperature resolution and the filter time constant should be selected.

Further, the adjusted value/time constant generating part is provided with a second gradient/filter time constant mapping part 24. A correlation between the current value of the power semiconductor device and the temperature resolution to be used upon signal amplification with respect to the current value is stored in the second gradient/filter time constant mapping part 24. Further, the current value of the power semiconductor device and a value of the filter time constant to be used with respect to the current value are stored. The second gradient/filter time constant mapping part 24 can output a temperature resolution and a filter time constant suitable for the current value from the input current value of the power semiconductor device.

Here, if the input current value is higher than a predetermined value, the second gradient/filter time constant mapping part 24 outputs a content that lower values of the temperature resolution and the filter time constant should be selected. On the other hand, if the input voltage value is lower than a predetermined value, the second gradient/filter time constant mapping part 24 outputs a content that high values of the temperature resolution and the filter time constant should be selected.

Further, the adjusted value/time constant generating part is provided with a third gradient/filter time constant mapping part 25. A correlation between a driving signal of the power semiconductor device and a temperature resolution to be used upon amplification with respect to the driving signal is stored in the third gradient/filter time constant mapping part 25. The driving signal of the power semiconductor device and a value of the filter time constant to be used with respect to the driving signal are also stored. The third gradient/filter time constant mapping part 25 can output a temperature resolution and a filter time constant suitable for the driving signal from the input driving signal of the power semiconductor device.

Here, if the driving frequency of the input driving signal is higher than a predetermined value, the third gradient/filter time constant mapping part 25 outputs a content that low values of the temperature resolution and the filter time constant should be selected. On the other hand, if the driving frequency of the input driving signal is lower than the predetermined value, the third gradient/filter time constant mapping part 25 outputs a content that high values of the temperature resolution and the filter time constant should be selected.

Further, the adjusted value/time constant generating part is provided with a fourth gradient/filter time constant mapping part 26. A correlation between the temperature sensor output 20 and the temperature resolution to be used upon signal amplification with respect to the temperature sensor output 20 is stored in the fourth gradient/filter time constant mapping part 26. Here, the temperature sensor output 20 is a signal of the temperature output from the temperature calculation processing section 100. Further, the temperature sensor output 20 and the value of the filter time constant to be used with respect to the temperature sensor output 20 are stored. The fourth gradient/filter time constant mapping part 26 can output, from the temperature sensor output 20, a temperature resolution and a filter time constant suitable for the temperature sensor output 20.

Here, if the value of the input temperature sensor output 20 is higher than a predetermined value, the fourth gradient/filter time constant mapping part 26 outputs a content that low values of the temperature resolution and the filter time constant should be selected. On the other hand, if the value of the input temperature sensor output 20 is lower than the predetermined value, the fourth gradient/filter time constant mapping part 26 outputs a content that high values of the temperature resolution and the filter time constant should be selected.

Further, the adjusted value/time constant generating part is provided with a fifth gradient/filter time constant mapping part 27. A correlation between the sensor detected temperature of the power semiconductor device and temperature resolution to be used upon signal amplification with respect to the sensor detected temperature is stored in the fifth gradient/filter time constant mapping part 27. The sensor detected temperature of the power semiconductor device and the value of the filter time constant to be used with respect to the sensor detected temperature are stored in the fifth gradient/filter time constant mapping part 27. The fifth gradient/filter time constant mapping part 27 can output, from the input sensor detected temperature of the power semiconductor device, a temperature resolution and a filter time constant suitable for the sensor detected temperature.

Here, if the input sensor detected temperature is higher than a predetermined value, the fifth gradient/filter time constant mapping part 27 outputs a content that lower values of the temperature resolution and the filter time constant should be selected. On the other hand, if the input sensor detected temperature is lower than a predetermined value, the fifth gradient/filter time constant mapping part 27 outputs a content that high values of the temperature resolution and the filter time constant should be selected.

Further, the adjusted value/time constant generating part is provided with a sixth gradient/filter time constant mapping part 34. A correlation between the power value of the power semiconductor device and the temperature resolution to be used upon signal amplification with respect to the power value is stored in the sixth gradient/filter time constant mapping part 34. The power value of the power semiconductor device and the filter time constant to be used with respect to the power value are also stored. The sixth gradient/filter time constant mapping part 34 can output, from the input power value of the power semiconductor device, a temperature resolution and a filter time constant suitable for the power value.

Here, if the input power value is higher than a predetermined value, the sixth gradient/filter time constant mapping part 34 outputs a content that lower values of the temperature resolution and the filter time constant should be selected. On the other hand, if the input power value is lower than a predetermined value, the sixth gradient/filter time constant mapping part 34 outputs a content that high values of the temperature resolution and the filter time constant should be selected.

Thus, the first to sixth gradient/filter time constant mapping parts perform outputs related to the values of the temperature resolution and the filter time constant upon amplification according to respective inputs.

Further, the adjusted value/time constant generating part of the embodiment is provided with a switch 32. The outputs of the above-mentioned first to sixth gradient/filter time constant mapping parts are input to the switch 32. The switch 32 of the embodiment selects and outputs any one of the outputs by a method to be described later from among the outputs of the first to sixth gradient/filter time constant mapping parts. This output is transmitted to the gradient adjustment block 28 and the filter 29 (to be described later) in the temperature sensor correction processing part 42.

Figure 3:
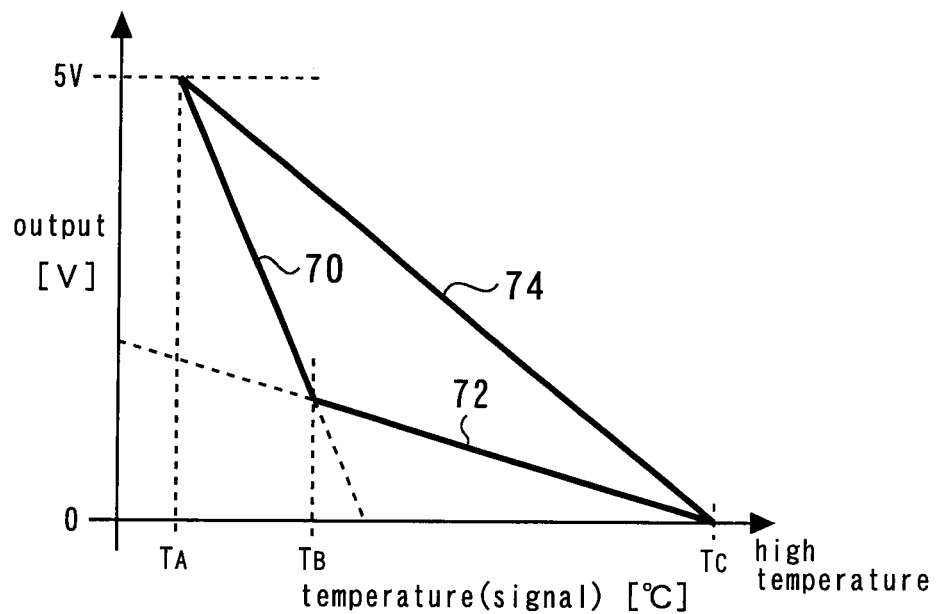
FIG. 3 is a graph for explaining a method of signal amplification performed by the gradient adjustment block.

The gradient adjustment block 28 of the temperature sensor correction processing part 42 amplifies the output from the adder part 19 based on a gradient (temperature resolution) defined by the switch 32 of the adjusted value/time constant generating part in the semiconductor load corrected value setting part 43. Thus, the gradient adjustment block 28 is connected to the adder part 19 and the switch 32. FIG. 3 is used to describe more details of the amplification performed by the gradient adjustment block 28. FIG. 3 is a graph for explaining a method of signal amplification performed by the gradient adjustment block 28 of the embodiment. In FIG. 3, the horizontal axis is temperature transmitted from the adder part 19, and the vertical axis is output voltage of the gradient adjustment block 28. In the embodiment, amplification is performed using a gradient 70 and a gradient 72. In other words, amplification is performed according to the gradient 70 when the temperature of the power semiconductor device falls within the range of TA to TB. On the other hand, amplification is performed according to the gradient 72 when the temperature of the power semiconductor device falls within the range of TB to Tc. The selection between the gradient 70 and the gradient 72 depends on the content indicated by the signal received from the switch 32.

Thus, the temperature resolution is changed depending on the temperature of the power semiconductor device. It is apparent from FIG. 3 that amplification using the gradient 70 results in relatively high amplification compared to amplification using the gradient 72.

Figure 4:
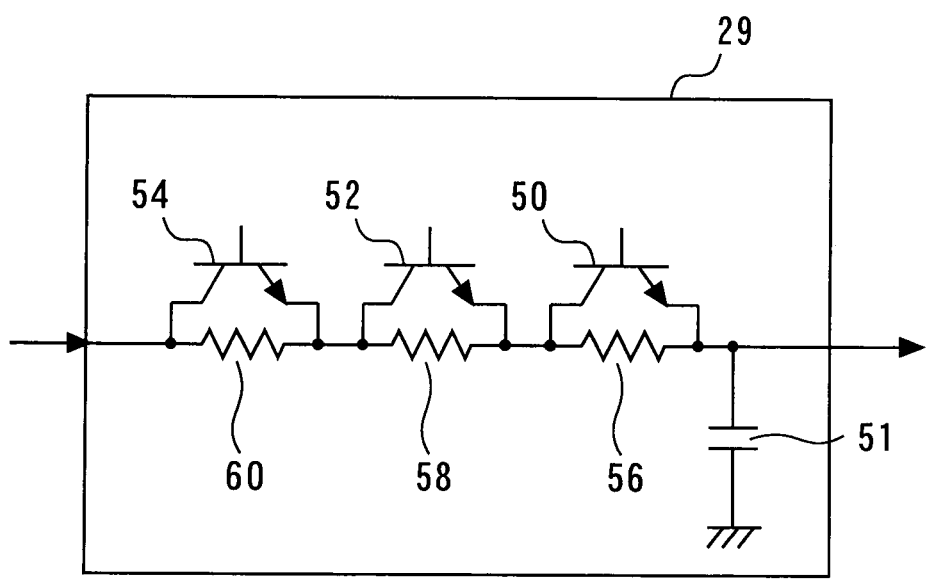
FIG. 4 is a circuit diagram showing the structure of the filter.

The filter 29 is arranged after the gradient adjustment block 28 of the above-mentioned temperature sensor correction processing part 42. The filter 29 performs filtering of the signal output from the gradient adjustment block 28 according to the time constant defied by the switch 32 of the adjusted value/time constant generating part in the semiconductor load corrected value setting part 43. Thus, the filter 29 is connected to the gradient adjustment block 28 and the switch 32. The filter 29 is formed of an RC circuit shown in FIG. 4. FIG. 4 is a circuit diagram showing the structure of the filter 29. The filter 29 is provided with resistors 56, 58, 60. Transistors 50, 52, 54 are arranged at both ends of each of the resistors 56, 58, 60. Further, a capacitor 51 is provided. As discussed above, the filter 29 has an RC circuit structure, and its time constant is variable by on or off of the transistors 50, 52, 54.

The signal after being filtered by the filer 29 is output to the outside of the temperature calculation processing section 100 as the temperature sensor output 20. The temperature detection system of the embodiment has the structure described above.

The following describes a temperature calculation method for the temperature detection system of the embodiment. First, the sensor detected temperature is input into the temperature sensor correction processing part 42, and information of the voltage value, current value, driving signal, and power value of the power semiconductor device is input into the semiconductor load corrected value setting part 43. These values are transmitted from the voltage signal conversion part 10, the current signal conversion part 11, the driving signal conversion part 12, and the power signal conversion part 13, and a sensor temperature transmission part 30, respectively.

Specifically, the sensor detected temperature is also input to the adder part 19 and the fifth gradient/filter time constant mapping part 27. On the other hand, the voltage value, the current value, the driving signal, and the power value are further input to the first correction mapping part 14, the second correction mapping part 15, the third correction mapping part 16, and the fourth correction mapping part 17, respectively. Further, the voltage value, the current value, the driving signal, and the power value are input to the first gradient/filter time constant mapping part 23, the second gradient/filter time constant mapping part 24, the third gradient/filter time constant mapping part 25, and the sixth gradient/filter time constant mapping part 34. Further, the temperature sensor output 20 is input to the fourth gradient/filter time constant mapping part 26.

The first correction mapping part 14, the second correction mapping part 15, the third correction mapping part 16, and the fourth correction mapping part 17 that have received the above-mentioned inputs calculate a difference value, respectively. Then, the calculated difference values are input to the weighting calculation part 18 as the calculated first to fourth difference values.

The weighting calculation part 18 calculates the above-mentioned actual correction difference value. The calculation of the actual correction difference value is performed as follows. First, the weighting calculation part 18 determines amounts of change between the current value and the previous value of the voltage value, current value, driving signal, and power value. The respective amounts of change are so converted that the voltage value, the current value, the driving signal, and the power value can be relatively compared by a method, for example, by ranking the respective amounts of change according to the amounts of change, respectively. When the respective amounts of change can be relatively compared, the voltage value, current value, driving signal, and power value are ranked in descending order by the amount of change.

Figure 5:
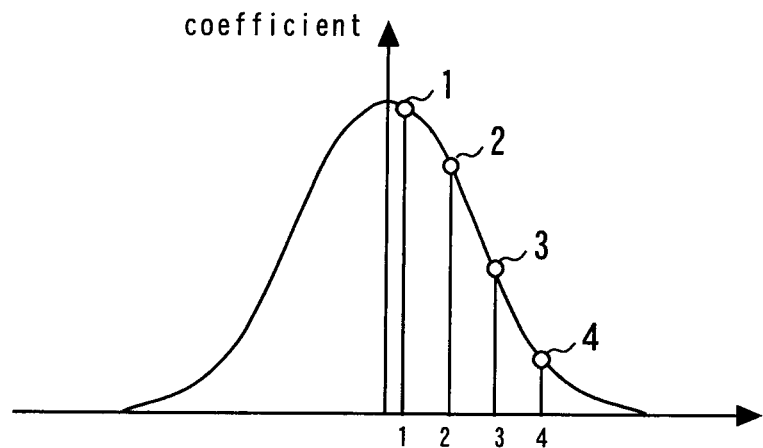
FIG. 5 is a graph showing a Gaussian function.

For example, suppose that the voltage value, the current value, the driving signal, and the power value are ranked in descending order by the amount of change as a result of the above-mentioned relative comparison. When they are ranked as mentioned above, the first difference value, the second difference value, the third difference value, and the fourth difference value are weighted by a weighting function. The weighting function is a function for returning larger value (coefficient) as the above-mentioned ranking is higher and the amount of change is larger. An example of such a weighting function is shown in FIG. 5. FIG. 5 is a graph showing a Gaussian function. FIG. 5 shows that the difference value (here, first difference value) ranked higher is multiplied by a higher coefficient, and that difference values ranked lower is multiplied by a lower coefficient.

The sum of products obtained in the manner as mentioned above is output to the adder part 19 as the actual correction difference value. In the embodiment, the Gaussian function shown in FIG. 5 is so standardized and adjusted that the sum of the coefficients to be multiplied by the first to fourth difference values becomes 1. Since the significance of providing the weighting calculation part is to make effective use of the difference values calculated from a plurality of load characteristics to define an actual correction difference value, the presence of this adjustment or the method is optional.

Next, the actual correction difference value calculated by the weighting calculation part 18 and the sensor detected temperature are input to the adder part 19. Here, the actual correction difference value and the sensor detected temperature are added together.

On the other hand, first to sixth gradient/filter time constant mapping parts that receive the above-mentioned inputs calculate a gradient (temperature resolution) and a filter time constant based on the input values, respectively. This calculation is made based on maps set beforehand in the first to sixth gradient/filter time constant mapping parts. The output of each of the first to sixth gradient/filter time constant mapping parts is input to the switch 32.

The switch 32 selects the value of 1 from among the gradients (temperature resolutions) and the filter time constants calculated by first to sixth gradient/filter time constant maps. This selection is made as follows. First, like in the weighting calculation part, the amount of change from the previous value to the current value is determined with respect to the voltage value, the current value, the driving signal, the power value, the sensor detected temperature, and the temperature sensor output, and converted to a respectively comparable value, respectively. Next, as a result of respective comparison, a characteristic exhibiting the maximum amount of change is selected. Then, any one of characteristics is selected from the selected voltage value, current value, driving signal, power value, sensor detected temperature, and temperature sensor output. The gradient (temperature resolution) and the filter time constant output from the gradient/filter time constant mapping part to which the selected characteristic is input are the gradient (temperature resolution) and the filter time constant selected by the switch 32.

The gradient (temperature resolution) selected by the switch 32 is output into the gradient adjustment block 28. On the other hand, the filter time constant selected by the switch 32 is output into the filter 29.

After completion of the above processing, the output of the adder part 19 is amplified by the gradient selected by the switch 32 in the gradient adjustment block 28 of the temperature sensor correction processing part 42. The signal amplified in the gradient adjustment block 28 is input to the filter 29. In the filter 29, the signal amplified in the gradient adjustment block 28 is filtered by means of a filter having the time constant selected by the switch 32. An example of a method of changing the time constant uses a transistor shown in FIG. 4.

The filtered signal is output to an external device or the like as the temperature sensor output 20. The above describes processing performed by the temperature detection system of the embodiment. Note that the above-mentioned processing can be embodied via software on a microcomputer or an analog circuit in the form of an IC.

According to the structure of the embodiment, the deviation between the sensor detected temperature and the highest temperature of the power semiconductor device can be reduced or removed. First, since the first to fourth correction mapping parts are provided to calculate difference values corresponding to the load characteristics such as the voltage value, the current value, the driving signal, and the power value, difference values corresponding to the respective load characteristics can be calculated. Then, the weighting calculation part performs weighting according to the amounts of change of the load characteristics to calculate the first to fourth difference values in order to calculate the actual correction difference value. Thus, the actual correction difference value takes a value that reflects a difference between the actual temperature and the sensor detected temperature with a high degree of precision. Therefore, even if the actual temperature cannot be measured directly, the actual temperature can be output with a high degree of precision by adding the actual correction difference value and the sensor detected temperature together.

Here, ranking is performed by the weighting calculation part depending on the amounts of change of the load characteristics such as the current value, voltage value, etc. as mentioned above results in the following. In other words, suppose that the temperature detection system of the embodiment is used for a system controlling a booster circuit. In this case, upon pressure rising time, the voltage of the booster circuit is controlled by a duty of the driving signal, and the current value is decided by the load on the booster circuit. Although a voltage change is decided by the duty in the booster circuit, it is difficult to capture the change in current even if the voltage value and the driving signal are sensed. Therefore, like in the embodiment, the amounts of change in current, voltage, etc. are captured, and weighting is performed according to each of the amounts of change to calculate the actual correction difference value, resulting in being capable of correcting temperature (calculating the actual correction difference value) accurately even in a transient state in which the control state of the load changes.

Further, the significance of amplification by changing between the gradient 70 and the gradient 72 as shown in FIG. 3 performed by the gradient adjustment block of the embodiment is as follows. Since temperature is high in a temperature zone $T_B$-$T_C$ in FIG. 3, earlier protection control is required rather than the accurate capturing of the actual temperature. On the other hand, since there is no worry of overheat of the power semiconductor device in a temperature zone $T_A$-$T_B$ in FIG. 3, the actual temperature is captured more accurately and required to put it to work on the generation of a control command with less loss. In such a situation, amplification with a uniform temperature resolution despite the temperature like a gradient 74 in FIG. 3 is not necessarily reasonable. However, as in the embodiment, the voltage value to be assigned in the temperature zone $T_A$-$T_B$ is made larger to increase the temperature resolution, while the temperature resolution is reduced more in the temperature zone $T_B$-$T_C$ compared to the temperature zone $T_A$-$T_B$. In a system with a limited width of the output voltage (5V as shown in FIG. 3 in the embodiment), it helps with feedback control in the low temperature side ($T_A$-$T_B$) with a high degree of precision.

Further, the filter provided in the embodiment can vary the time constant based on the command from the switch. Then, in the embodiment, a reduced filter time constant is used when the load characteristics such as the current value, the voltage value, etc. are equal to or more than predetermined values. If the load characteristics are equal or more than predetermined positions, since there is concern about the overheat of the power semiconductor device, the low time constant as described above is used to accelerate the response. This can avoid the above-mentioned overheat because rapid updating of control can be possible. On the other hand, if the load characteristics such as the current value and the voltage value are equal or less than predetermined values at which there is no need to worry about overheat, the time constant is increased to perform desired filtering.

Figure 6:
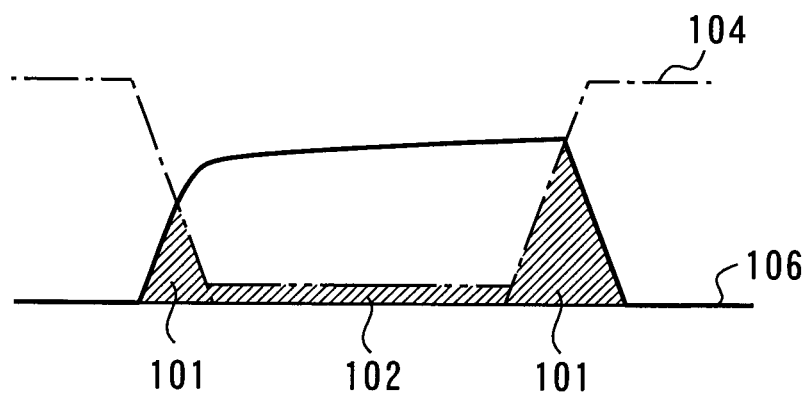
FIG. 6 shows a voltage waveform and a current waveform.

The load characteristics such as the current value, the voltage value, etc. used in the embodiment are not limited to those in the embodiment. In other words, the load characteristics cited in the embodiment are not limited as long as they give rise to load losses. Here, the following describes a load loss by taking an example of a driving signal. As shown in FIG. 6, the driving signal contains switching information. FIG. 6 shows a voltage waveform 104 and a current waveform 106.

Specifically, the losses of load captured from the driving signal are a switching loss 101 and a DC loss 102 in FIG. 6. Such losses cause heat generation of the power semiconductor device and hence monitoring from a perspective of overheat protection is required. Since the value of loss can be captured from corresponding one of the load characteristics, the correlation of a load characteristic-difference value is provided beforehand in the form of a map or the like. In the embodiment, it is the third correction mapping part 16. Then, the difference value (here, the third difference value) corresponding to the sum of the switching loss 101 and the DC loss 102 is calculated from the driving frequency of the driving signal (or the load loss can be used directly).

In the example of the driving signal, if the driving frequency is smaller than a predetermined value, for example, there is a need to consider the DC loss in addition to the switching loss. If the driving frequency is larger than the predetermined value, since the switching loss becomes dominant, the DC loss may not be considered.

As discussed using the example of the driving signal, the load characteristics are characteristics that give rise to losses. The characteristics that give rise to losses include information such as the temperature of the power semiconductor device in addition to the current, the voltage, the driving signal, and the electric power.

In the embodiment, although the weighting calculation part 18 multiplies the first to fourth difference values by weighting functions to calculate the actual correction difference value, the present invention is not limited thereto. In other words, the weighting calculation part 18 selects a difference value from the input first to fourth difference values to set the difference value as the actual correction difference value. In this case, the effects of the invention can be obtained. Here, it is considered that the above-mentioned "selection" is made based on the amount of change from the previous value of the load characteristics, for example, like the switch 32 is made.

In the embodiment, the first correction mapping part 14, the second correction mapping part 15, the third correction mapping part 16, and the fourth correction mapping part 17 are provided, but the present invention is not limited to this structure. In other words, the number of correction mapping parts can be more or less than four to obtain the effect of the invention as long as proper overheat protection and control with less loss are possible. For example, if there is no problem in defining the actual correction difference value only from the voltage of the power semiconductor device (load), the first correction mapping part has only to be provided, resulting in simplification of the temperature calculation processing section 100. For the same reason, providing six gradient/filter time constant maps, i.e., the first gradient/filter time constant mapping part 23, the second gradient/filter time constant mapping part 24, the third gradient/filter time constant mapping part 25, the fourth gradient/filter time constant mapping part 26, the fifth gradient/filter time constant mapping part 27, and the sixth gradient/filter time constant mapping part 34 is not essential to obtain the effects of the invention.

In the embodiment, the first correction mapping part 14 can acquire signals of the sensor detected temperature and the voltage value to define a difference from both the sensor detected temperature and the actual temperature. In this case, more accurate calculation of the first difference value is possible. The same holds true for the second, third, and fourth correction mapping parts.

Second Embodiment

This embodiment relates to a temperature detection system for performing the overheat protection on the power semiconductor device and the like based on the accurate measurement result of the actual temperature. The structure of the invention is the same as that of Embodiment 1 except the following point. In other words, in addition to the structure of Embodiment 1, this embodiment is provided with an overheat protection part 200 shown in FIG. 7.

Figure 7:
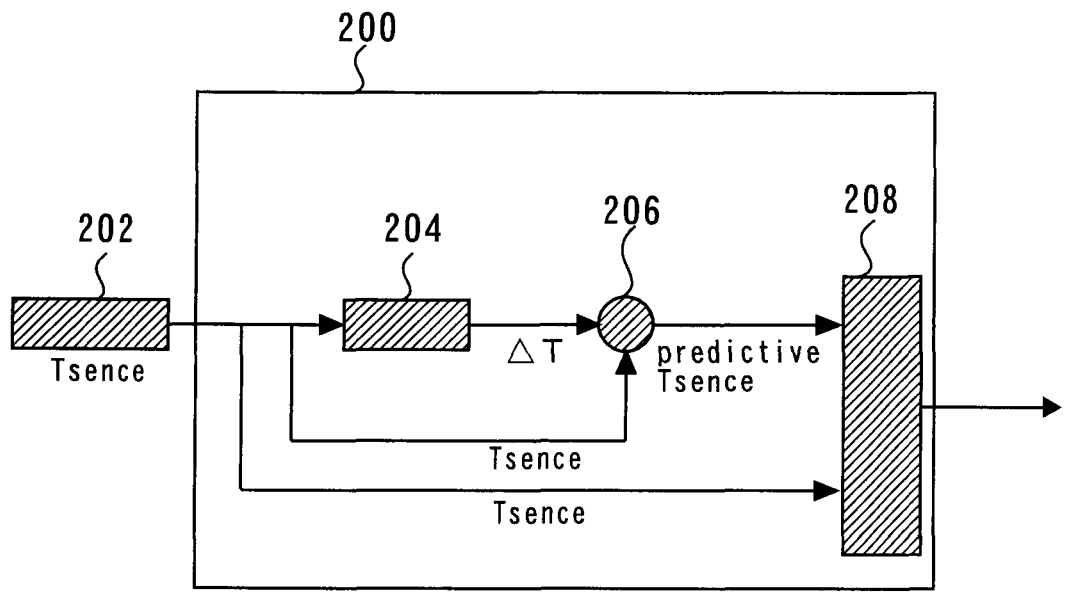
FIG. 7 is a block diagram for explaining the overheat protection part.

The following describes the overheat protection part 200 with reference to FIG. 7. The overheat protection part 200 is provided with a predictive block 204. The temperature sensor output (in the embodiment, referred to as "$T_{SENCE}$" for convenience) as the output of the temperature detection system described in Embodiment 1 is input to the predictive block 204 as an input value. Then, the predictive block 204 calculates a difference $\Delta T$ between the above-mentioned $T_{SENCE}$ and a predictive temperature after predetermined time has elapsed. The overheat protection part 200 is provided with an adder part 206 after the predictive block 204. The adder part 206 adds the difference $\Delta T$ calculated in the predictive block 204 and $T_{SENCE}$. The added signal is output to an overheat protection block 208 as a predictive $T_{SENCE}$. The value of $T_{SENCE}$ is also input. If the predictive $T_{SENCE}$ as the input is equal to or more than the overheat protection temperature set in the overheat protection block 208 beforehand, the overheat protection block 208 stops the power semiconductor device (heat generator). Further, if $T_{SENCE}$ is equal to or more than the above-mentioned overheat protection temperature, it stops the power semiconductor device.

Various calculation methods performed in the predictive block 204 are considered. The following illustrates an example. The predictive block 204 performs $\Delta T = dT_{SENCE}/dT$ as a differential equation with respect to the acquired $T_{SENCE}$ and multiplies it by the sampling time $\Delta_{TIME}$ of the microcomputer to determine $\Delta T$.

Figure 8:
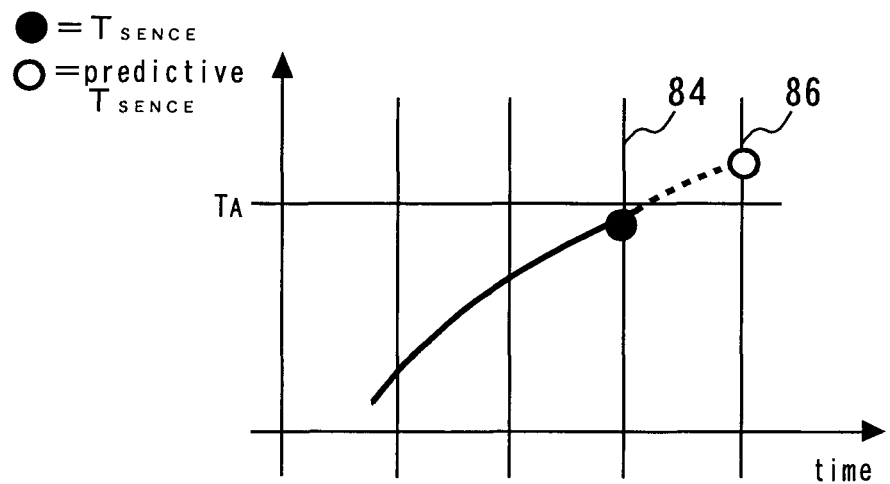
FIG. 8 is a graph for explaining the processing of the overheat protection part.

FIG. 8 is a graph for explaining the processing of the overheat protection part 200. In FIG. 8, although the graph indicates that the temperature ($T_{SENCE}$) of the power semiconductor device is equal to or less than the overheat protection temperature at a current time point 84, a predictive end-point temperature (predictive $T_{SENCE}$) predicted at an elapsed time point 86 after a predetermined time has elapsed is expected to be higher than the overheat protection temperature. According to the structure of the embodiment, since the predicted $T_{SENCE}$ can be captured at the time point 86 after the predetermined time has elapsed from the current time point 84, the overheat protection can be performed. Since the $T_{SENCE}$ of the embodiment is the same as or sufficiently close to the actual temperature as mentioned above, the overheat protection of the embodiment can be performed with a high degree of precision.

According to the present invention, the temperature of the power semiconductor device can be measured with a high degree of precision.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2007-331965, filed on Dec. 25, 2007 including specification, claims, drawings and summary, on which the Convention priority of the present application is based, are incorporated herein by reference in its entirety.

What is claimed is:

1. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating a difference value between an actual temperature of the power semiconductor device and the temperature of the power semiconductor device detected by the chip temperature detection means, based on the power loss-related characteristic value and a stored correlation that relates the power loss-related characteristic value to the actual temperature and the temperature detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal.

2. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal, wherein
the difference value calculating means further comprises
amount of change calculating means for calculating an amount of change from a previous value with respect to individual power loss-related characteristic values,
ranking means for ranking the amounts of change in descending order to make the amounts of change relatively comparable,
individual difference value calculating means for calculating an individual difference value between the actual temperature of the power semiconductor device and the temperature detected by the chip temperature detection means each time a power loss-related characteristic value is obtained, and
individual difference value weighting means for calculating a product of the individual difference values and a weight according to a weighting function for returning larger values according to a higher ranking, and
the difference value is a sum of the products calculated by the individual difference value weighting means.

3. A temperature detection system comprising:

a power semiconductor device;

chip temperature detection means for detecting a temperature of the power semiconductor device, the chip temperature detection means being coupled to the power semiconductor device;

power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;

difference value calculating means for calculating, based on the power loss-related characteristic value, a difference value between an actual temperature of the power semiconductor device and the temperature of the power semiconductor device detected by the chip temperature detection means;

corrected temperature signal generating means for generating a corrected temperature signal by adding the temperature detected by the chip temperature detection means and the difference value calculated based on the power loss-related characteristic value of the power semiconductor device; and output means for outputting the corrected temperature signal, wherein the difference value calculating means further comprises amount of change calculating means for calculating an amount of change from a previous value with respect to individual power loss-related characteristic values, amount of change maximum characteristic identifying means for making the amounts of change relatively comparable to identify an individual power loss-related characteristic value having a maximum amount of change, and specific difference value calculating means for calculating the difference value from the individual power loss-related characteristic value identified by the amount of change maximum characteristic identifying means.

4. A temperature detection system comprising:

a power semiconductor device;

chip temperature detection means for detecting a temperature of the power semiconductor device, the chip temperature detection means being coupled to the power semiconductor device;

power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;

difference value calculating means for calculating, based on the power loss-related characteristic value, a difference value between an actual temperature of the power semiconductor device and the temperature of the power semiconductor device detected by the chip temperature detection means;

corrected temperature signal generating means for generating a corrected temperature signal by adding the temperature detected by the chip temperature detection means and the difference value calculated based on the power loss-related characteristic value of the power semiconductor device; and output means for outputting the corrected temperature signal;

a filter arranged in a transport pathway of the corrected temperature signal and including a variable resistor and a capacitor;

first time constant setting means for setting a time constant of the filter as a first time constant;

second time constant setting means for setting the time constant of the filter as a second time constant larger than the first time constant; and switching means for performing switching to use the first time constant setting means when the power loss-related characteristic value is equal to or more than a predetermined value and to use the second time constant setting means when the power loss-related characteristic value is less than the predetermined value.

5. A temperature detection system comprising:

a power semiconductor device;

chip temperature detection means for detecting a temperature of the power semiconductor device, the chip temperature detection means being coupled to the power semiconductor device;

power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;

difference value calculating means for calculating, based on the power loss-related characteristic value, a difference value between an actual temperature of the power semiconductor device and the temperature of the power semiconductor device detected by the chip temperature detection means;

corrected temperature signal generating means for generating a corrected temperature signal by adding the temperature detected by the chip temperature detection means and the difference value calculated based on the power loss-related characteristic value of the power semiconductor device; and output means for outputting the corrected temperature signal; and amplification means arranged in a transport pathway of the corrected temperature signal for amplifying the corrected temperature signal to a predetermined voltage;

wherein the amplification means further comprises first amplification means for amplifying with a first temperature resolution, second amplification means for amplifying with a second temperature resolution higher than the first temperature resolution, and switching means for performing switching to use the first amplification means when the power loss-related characteristic value is equal to or more than a predetermined value and to use the second amplification means when the power loss-related characteristic value is less than the predetermined value.

6. The temperature detection system according to claim 4, wherein the power loss-related characteristic value is the corrected temperature signal.

7. The temperature detection system according to claim 4, wherein the power loss-related characteristic value is an amount of change from a previous value of the corrected temperature signal.

8. The temperature detection system according to claim 4, wherein the power loss-related characteristic value is a driving frequency of the power semiconductor device.

9. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal, wherein
the power loss-related characteristic value is a current value of the power semiconductor device, and
the power loss-related characteristic value acquiring means includes a current sensor for measuring the current value of the power semiconductor device.

10. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal, wherein
the power loss-related characteristic value is a voltage value of the power semiconductor device, and
the power loss-related characteristic value acquiring means includes a voltage sensor for measuring the voltage value of the power semiconductor device.

11. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device,
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal, wherein
the power loss-related characteristic value is a power value of the power semiconductor device, and
the power loss-related characteristic value acquiring means includes a power value sensor for measuring the power value of the power semiconductor device.

12. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device; and
output means for outputting the corrected temperature signal, wherein
overheat protection means for giving a warning to an external device when the corrected temperature signal is more than a predetermined value.

13. A temperature detection system comprising:
a power semiconductor device;
chip temperature detection means for detecting a temperature of the power semiconductor device, the chip temperature detection means being coupled to the power semiconductor device;
power loss-related characteristic value acquiring means for measuring at least one of a current and a voltage of the power semiconductor device to acquire a power loss-related characteristic value of the power semiconductor device, the power loss-related characteristic value including at least one of a driving frequency, a current value, a voltage value, and a power value of the power semiconductor device;
difference value calculating means for calculating, based on the power loss-related characteristic value, a difference value between an actual temperature of the power semiconductor device and the temperature of the power semiconductor device detected by the chip temperature detection means;
corrected temperature signal generating means for generating a corrected temperature signal by adding the temperature detected by the chip temperature detection means and the difference value calculated based on the power loss-related characteristic value of the power semiconductor device;
output means for outputting the corrected temperature signal;
predictive value calculating means for calculating, from the corrected temperature signal and the power loss-related characteristic value, a predictive value of temperature after a predetermined time has elapsed; and
overheat protection means for giving a warning to an external device when the predictive value is more than a predetermined value.

14. The temperature detection system according to claim 4, wherein
the switching means comprises
plural power loss-related characteristic value acquiring means for acquiring two or more of the power loss-related characteristic values including the driving frequency, the current value, the voltage value, and the power value of the power semiconductor device,
amount of change calculating means for calculating an amount of change from a previous value with respect to an individual power loss-related characteristic value of each of the two or more power loss-related characteristic values,
ranking means for relatively comparing the individual loss-related characteristic values to rank the individual loss-related characteristic values,
weighting calculation means for calculating a product of each individual loss-related characteristic value and a weight according to a weighting function for returning larger values according to a higher ranking, and
sum calculation means for calculating a sum of power loss-related characteristic values as a sum of products calculated by the weighting calculation part, and
the power loss-related characteristic value is the sum of power loss-related characteristic values.

15. A temperature detection system comprising:
a power semiconductor device;
a chip temperature detection unit configured to detect a temperature of the power semiconductor device, the chip temperature detection unit being coupled to the power semiconductor device;
a power loss-related characteristic value acquiring unit configured to measure at least one of a current and a voltage of the power semiconductor device to acquire a power loss-related characteristic value of the power semiconductor device, the power loss-related characteristic value including at least one of, the power loss-related characteristic value including at least one of a driving frequency, a current value, a voltage value, and a power value of the power semiconductor device;
a difference value calculating unit configured to calculate a difference value between an actual temperature of the power semiconductor device and the temperature of the power semiconductor device detected by the chip temperature detection unit, based on the power loss-related characteristic value and a stored correlation that relates the power loss-related characteristic value to the actual temperature and the temperature detected by the chip temperature detection unit;
a corrected temperature signal generating unit configured to generate a corrected temperature signal by adding the temperature detected by the chip temperature detection unit and the difference value calculated based on the power loss-related characteristic value; and an output unit configured to output the corrected temperature signal.

* * * * *